(12) United States Patent
Spangler et al.

(10) Patent No.: US 9,324,128 B2
(45) Date of Patent: Apr. 26, 2016

(54) TECHNIQUES FOR IMPROVING RENDERING EFFICIENCY

(71) Applicant: Intel Corporation, Santa Clara, CA (US)

(72) Inventors: Steven J. Spangler, El Dorado Hills, CA (US); Prasoonkumar Surti, Folsom, CA (US); Christopher D. Berry, Folsom, CA (US); Hiroshi Akiba, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 222 days.

(21) Appl. No.: 13/826,114

(22) Filed: Mar. 14, 2013

(65) Prior Publication Data

US 2014/0267338 A1 Sep. 18, 2014

(51) Int. Cl.
*G09G 5/36* (2006.01)
*G06T 1/60* (2006.01)

(52) U.S. Cl.
CPC ........................................ *G06T 1/60* (2013.01)

(58) Field of Classification Search
CPC .. G09G 2360/121; G09G 5/39; G06F 12/121; G06F 12/0891; G06F 2212/653
USPC .................................................. 345/557, 549
See application file for complete search history.

(56) References Cited

U.S. PATENT DOCUMENTS

| | | | |
|---|---|---|---|
| 5,202,969 A | 4/1993 | Sato et al. | |
| 5,701,516 A | 12/1997 | Cheng et al. | |
| 6,433,788 B1 * | 8/2002 | Morein | 345/557 |
| 6,498,606 B1 * | 12/2002 | Penna et al. | 345/422 |
| 2009/0189909 A1 | 7/2009 | Jiao et al. | |

OTHER PUBLICATIONS

Extended European Search Report received for European Patent Application EP14159675, mailed May 30, 2014, 5 pages.

* cited by examiner

*Primary Examiner* — Hau Nguyen
(74) *Attorney, Agent, or Firm* — Kacvinsky Daisak Bluni PLLC

(57) ABSTRACT

Various embodiments are generally directed to techniques for causing the storage of a color data value of a clear color to be deferred or entirely avoided as color data values of primitives of an image are stored. An apparatus includes a processor element; and a logic to store color data values of a block of pixels of the image in a first portion of a cache line, store an indication of the first portion as written and of a second portion of the cache line as not in a per-portion table, evict contents of the first and second portions, and store the contents of the first portion in an image data and store a color data value of a clear color in place of the contents of the second portion in the image data in response to the indications stored in the per-portion table. Other embodiments are described and claimed.

19 Claims, 9 Drawing Sheets

TECHNIQUES FOR IMPROVING RENDERING EFFICIENCY

TECHNICAL FIELD

Embodiments described herein generally relate to increasing the efficiency with which two-dimensional images of three-dimensional objects are rendered.

BACKGROUND

In rendering a two-dimensional (2D) image of three-dimensional (3D) object(s), there may or may not be a background color or "clear color" remaining in some portions of the image following rendering. This varies depending on the kind of object(s) rendered, whether the object(s) fill the entire image and/or the purpose for which the object(s) are rendered. Thus, whether there will be pixels that remain uncolored during rendering such that they must be colored a clear color to make the image complete is often not known in advance.

Given this uncertainty, it has become accepted practice to initially color all pixels of an image with the clear color to ensure that no pixels are left with an undefined or random color after rendering. However, this invariably means that at least some, if not all, of the effort expended in first coloring of all of the pixels with the clear color is wasted, as at least some of them will be overwritten with a color of an object during rendering.

This waste is not just measurable in time wasted between uses of a rendering engine to render images while the writing of clear color values to all pixels is occurs, but is also measurable in wasted processor time and wasted memory bandwidth that could have been employed for other purposes than repeatedly writing the color data value for the clear color into memory locations for every pixel. It is with respect to these and other considerations that the embodiments described herein are needed.

DETAILED DESCRIPTION

Figure 1:
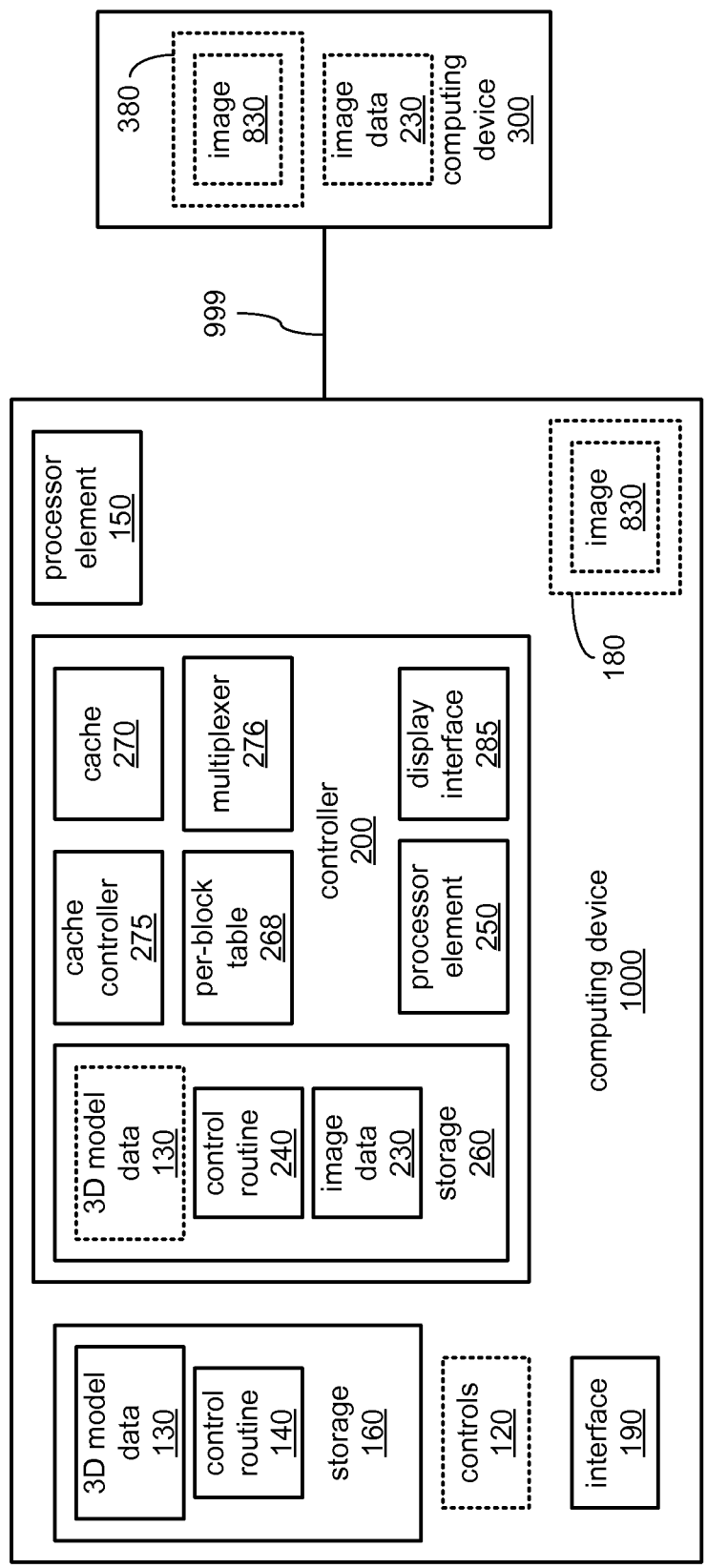
FIG. 1 illustrates an embodiment of possible interactions among computing devices to render an image.

Various embodiments are generally directed to techniques for causing the storage of a color data value of a clear color to be deferred or entirely avoided as color data values of primitives (e.g., lines, polygons, etc.) are stored for pixels of an image. More specifically, bit tables associated with a cache and with an image buffer are maintained in which each bit indicates whether a block of pixels has yet been colored as a result of rendering the image. One such table associated with the cache is used to control a multiplexer used to color the still-uncolored blocks of pixels with the color data value of the clear color as each cache line of multiple blocks of pixels is evicted from the cache and into storage. Another such table associated with the storage is used at the completion of rendering of the image to identify any blocks of pixels of the image that have still been left uncolored such that the color data value for the clear color may be stored in the storage at locations needed to color those still-uncolored blocks of pixels with the clear color.

It is envisioned that following rendering of least some images where the rendering process results in the coloring of every pixel within those images, there should be no need to ever color a pixel with the clear color. Thus, by deferring the coloring of pixels with the clear color until after the rendering is done, there is no processing time or memory bandwidth wasted on color pixels with the clear color only to have that clear color overwritten. For other images where the rendering process does not result in every pixel being colored, the deferral of color pixels with the clear color minimizes such waste since only the pixels needing to be colored with the clear color are so colored. Depending on the nature of the images rendered, the improvement in time to create each image can be significant.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 that may be coupled to another computing device 300 to provide the other computing device 300 with image data of an image rendered by the computing device 1000. Each of these computing devices 1000 and 300 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 1000 and 300 exchange signals conveying rendered images through a network 999. However, one or both of these computing devices may exchange other data entirely unrelated to rendered images with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 incorporates one or more of a processor element 150, a storage 160, controls 120, a display 180, a controller 200 and an interface 190 to couple the computing device 1000 to the network 999. The storage 160 stores one or more of a control routine 140 and a 3D model data 130. The controller 200 incorporates one or more of a processor element 250, a storage 260, a per-block table 268, a cache 270, a cache controller 275 and a multiplexer 276. The storage 260 stores one or more of a control routine 240, a copy of the 3D model data 130 and an image data 230.

The control routine 140 incorporates a sequence of instructions operative on the processor element 150 in its role as a main processor element of the computing device 100 to implement logic to perform various functions. In executing the control routine 140, the processor element 150 is caused to maintain and/or modify the 3D model data 130. It may be that the processor element 150 is caused to modify the 3D model data 130 in response to receiving signals conveying commands to do so, possibly via the controls 120 (if present) in response to their being operated and/or possibly from another computing device via the network 999. In some embodiments, the computing device 1000 may be a video game system wherein the 3D model data 130 is a 3D representation of scenery and/or characters in a video game. In some embodiments, the computing device 1000 may be a medical workstation wherein the 3D model data 130 is a 3D representation of tissues, structures and/or organs of a human body. In such embodiments, an operator of the computing device may operate the controls 120 to manipulate the object(s) represented by the 3D model data 130.

Regardless of the purpose for maintaining and/or modifying the 3D model data 130, the processor element 150 is further caused by the control routine 140 to convey a copy of the 3D model data 130 to the controller 200. The processor element 150 then signals the controller 200 to render a 2D image 830 of whatever object(s) the 3D model data 130 from a specified direction of perspective. Following such rendering, the image 830 may then be visually presented on the display 180. Alternatively or additionally, the image data 230 representing the image 830 may be transmitted via the network 999 to the computing device 300, where the image data 230 may be stored and/or where the image 830 may be visually presented on a display 380 of the computing device 300.

The control routine 240 incorporates a sequence of instructions operative on the processor element 250 in its role as a main processor element of the computing device 1000 to implement logic to perform various functions. In executing the control routine 240, the processor element 250 receives the signal from the processor element 150 to render object(s) represented by the 3D model data 130 as the 2D image 830. In so doing, the processor element 250 is caused to rasterize the primitives (e.g., lines, triangles, polygons, etc.) of which those objects are formed in the 3D model data 130 to the image data 230 that represents the image 830. The image data 230 is thereby caused to include a 2D image of the subset of primitives of those object(s) that is viewable from the specified direction of perspective.

As will be explained in greater detail, although the image data 230 is ultimately stored in the storage 260 at the conclusion of rendering of the object(s) viewable therein, the image data 230 is actually initially rendered into the cache 270 overseen by the cache controller 275. As rendering proceeds, caches lines of the image data 230 rendered into the cache 270 are evicted through the multiplexer 276 and into the location of the storage 260 designated as the image buffer where the image data 230 is to be stored. During eviction and/or following completion of rendering, blocks of pixels not colored by the rendering process are colored with a clear color to complete the image 830 as represented by the image data 230.

In some embodiments, following rendering of the image 830 into the storage 260 as the image data 230, the processor element 250 may then operate the display interface 285 to cause the image 830 to be visually displayed on the display 180. In other embodiments, the processor element 250 may signal the processor 150 that rendering of the image 270 is complete and may provide the image data 230 to the processor element 150 to enable the processor element to, itself, visually present the image 830 on the display 180 and/or to transmit the image data 230 via the network 999 to the other computing device 300, possibly for visual presentation on its display 380.

It should be noted that although FIG. 1 depicts an implementation of the computing device 1000 that incorporates two processor elements (e.g., the processor elements 150 and 250) that separately perform their respective tasks, other embodiments of the computing device 1000 are possible in which a single processor element performs all of these aforedescribed tasks. However, it is envisioned that the controller 200 incorporates a graphics system in which the processor element 250 may be somewhat specialized and/or optimized to perform tasks related to rendering, video decompression, image resealing, etc., while the processor element 150 serves as a more general purpose processing circuit to execute an expected wider variety of instructions and tasks as directed by instructions of an operating system, one or more device drivers and/or one or more applications.

It should also be noted that although the rendering and ultimate storage of only the single two-dimensional image 830 represented by the single image data 230 is discussed and depicted herein, this should not be taken as an indication that the single image 830 is necessarily rendered or stored by itself as unconnected to any other image or piece of image data. More precisely, in some possible embodiments, the single two-dimensional image 830 may actually represent one plane of imagery among multiple aligned and/or overlapping planes of imagery that, together, define a three-dimensional image. Alternatively or additionally, the single two-dimensional image 830 may be just one frame of multiple ones of such frames of a piece of motion video. Thus, the techniques discussed and depicted herein should not be taken as limited to the rendering and storage of a single two-dimensional planar image that exists in isolation.

In various embodiments, each of the processor elements 150 and 250 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, each of the storages 160 and 260 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 190 may employ any of a wide variety of signaling technologies enabling the computing device 1000 to be coupled to other devices as has been described. Each of these interfaces includes circuitry providing at least some of the requisite functionality to enable such coupling. However, this interface may also be at least partially implemented with sequences of instructions executed by the processor element 150 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the display 180 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 2:
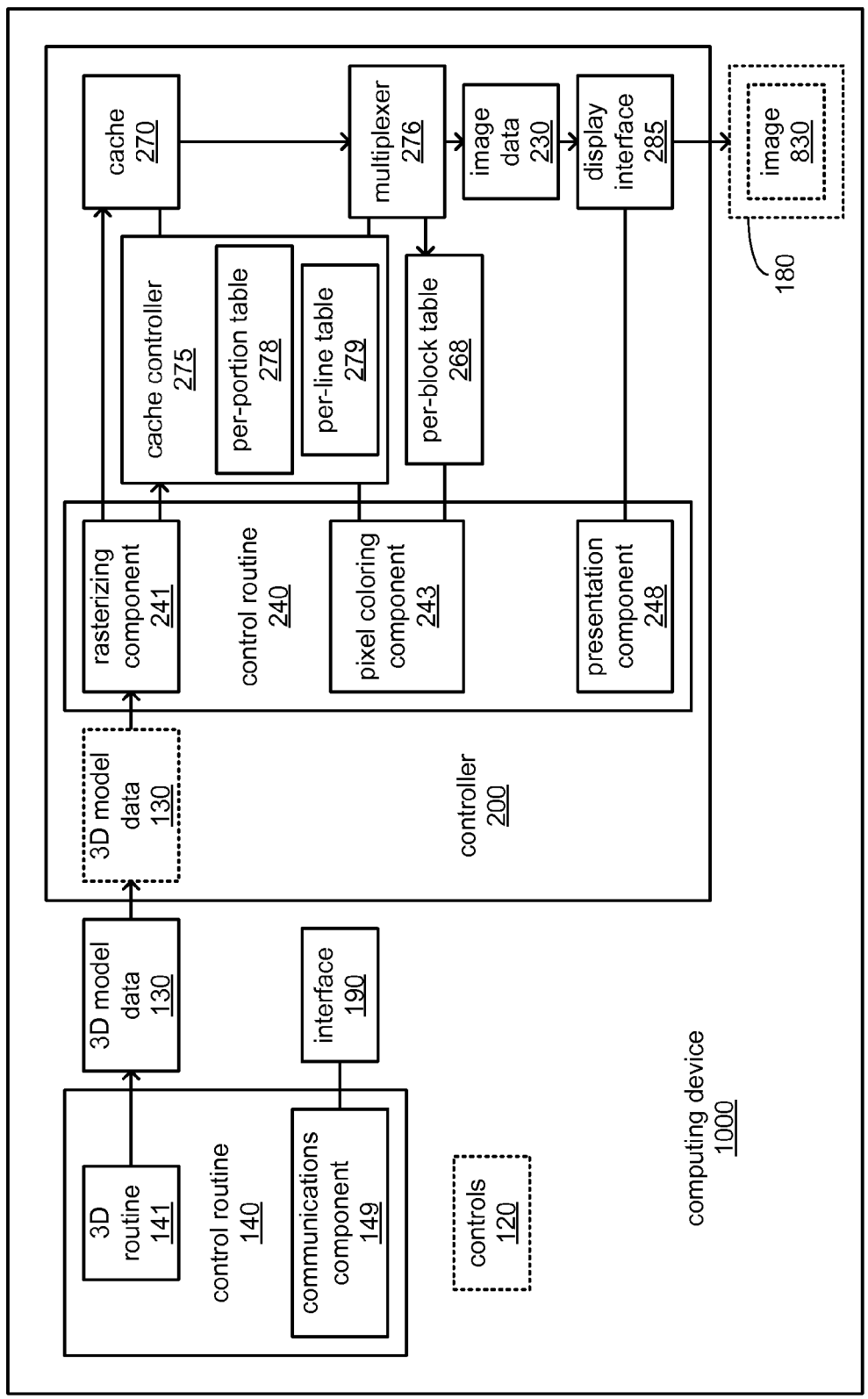
FIG. 2 illustrates a portion of the embodiment of FIG. 1.

FIG. 2 illustrates portions of the computing device 1000 of FIG. 1 in greater detail. More specifically, aspects of the operating environments of the processor elements 150 and 250 executing respective ones of the control routine 140 and 240 to perform the aforedescribed functions are depicted. As will be recognized by those skilled in the art, each of these control routines, including the components of which each is composed, are selected to be operative on (e.g., executable by) whatever type of processor or processors that are selected to implement each of these processor elements.

In various embodiments, the control routine 140 may include a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor elements 150 and 350, including without limitation, Windows™, OS X™, Linux®, or Android OS™ Where one or more device drivers are included, those device drivers may provide support for any of a variety of other components, whether hardware or software components, that include the computing devices 1000.

The control routine 140 includes a communications component 149 executable by the processor element 150 to operate the interface 190 to transmit and receive signals via the network 999 as has been described. Among the signals received may be signals conveying the 3D model data 130 to the computing device 1000 from another computing device via the network 999. As will be recognized by those skilled in the art, this communications component is selected to be operable with whatever type of interface technology is selected to implement this interface.

The control routine 140 also includes a 3D routine 141 executable by the processor element 150 to maintain and/or manipulate the 3D model data 130 as possibly specified in commands conveyed via signals received by the processor element 150, possibly from the controls 120 and/or the network 999 via the interface 190. As previously discussed, the 3D model data 130 may represent any of a variety of types of objects from fictitious ones drawn as part of the play of a video game to real objects of which a human body may be composed. Thus, the 3D routine 141 may be a video game program, a CT (computed tomography) scan or MRI (magnetic resonance imaging) data viewing program, etc.

The control routine 240 includes a rasterizing component 241 to perform part of a rasterization-based rendering process to create the image data 230 via rasterizing of at least the graphics primitives (e.g., lines, triangles, polygons, etc.) of whatever objects are represented by the 3D model data 130. In the process, the rasterizing component derives the colors for each of the pixels making up the image data 230. The rasterizing component 241 outputs color data values for multiple pixels at a time as blocks of pixels, filling portions of one or more cache lines of the cache 270, which is overseen by the cache controller 275. The control routine 240 also includes a pixel coloring component 243 that coordinates the handling of color data values written into the cache 270 by the rasterizing component 241.

The cache controller 275 includes a per-line table 279 that monitors the state of each line of the cache 270, including whether a line has been cleared, whether any portion of a line has been written to, and/or an indication of which cache line(s) were last written to more or less recently than others. As the lines of the cache 270 are filled, the cache controller 275 transfers or "evicts" the contents of one or more of the cache lines (often referred to as "evicting" cache lines) to the image buffer location within the storage 260 in which the image data 230 is ultimately stored to make cache lines available. In selecting cache lines to evict, the cache controller 275 may refer to the per-line table 279 to select cache lines that have not been written to for a longer period of time than others. Further, at the completion of rendering by the rasterizing component 241, the cache controller 275 effects the evicting of the contents of all of the cache lines of the cache 270 that still hold data resulting from the rendering to where the image data 230 is stored within the storage 260.

The cache controller 275 also includes a per-portion table 278 that monitors the state of each portion of each line of the cache 270, including which portions have been written to and which are untouched since the cache line of which they are a part was last cleared (e.g., evicted). Portions of a cache line that have been written to correspond to one or more pixels that have been colored, while portions of a cache line that have not been written to correspond to one or more pixels that have not been colored. Portions of a cache line that remain uncolored even as that cache line is evicted may correspond to one or more pixels that will remain uncolored throughout rendering such that they are ultimately colored with the clear color. In light of this, as cache lines are evicted, their evicted contents are routed through the multiplexer 276 on the way to being written to where the image data 230 is stored within the storage 260.

The indications in the per-portion table 278 of which portions of each evicted cache line have been written to such that their corresponding pixels have been colored by the rasterizing component 241 and the indications of which have not been so written are used to control the multiplexer to selectively insert the color data value for the clear color in place of the unwritten portions. Thus, what is written into the storage 260 at the location of the image data 230 may, for a given cache line, include a mixture of color data values from portions of that cache line that were written with those color data values by the rasterizing component 241 and color data values representing the clear color wherever there were portions of that cache line that were never written with any color data value by the rasterizing component 241.

Figure 3:
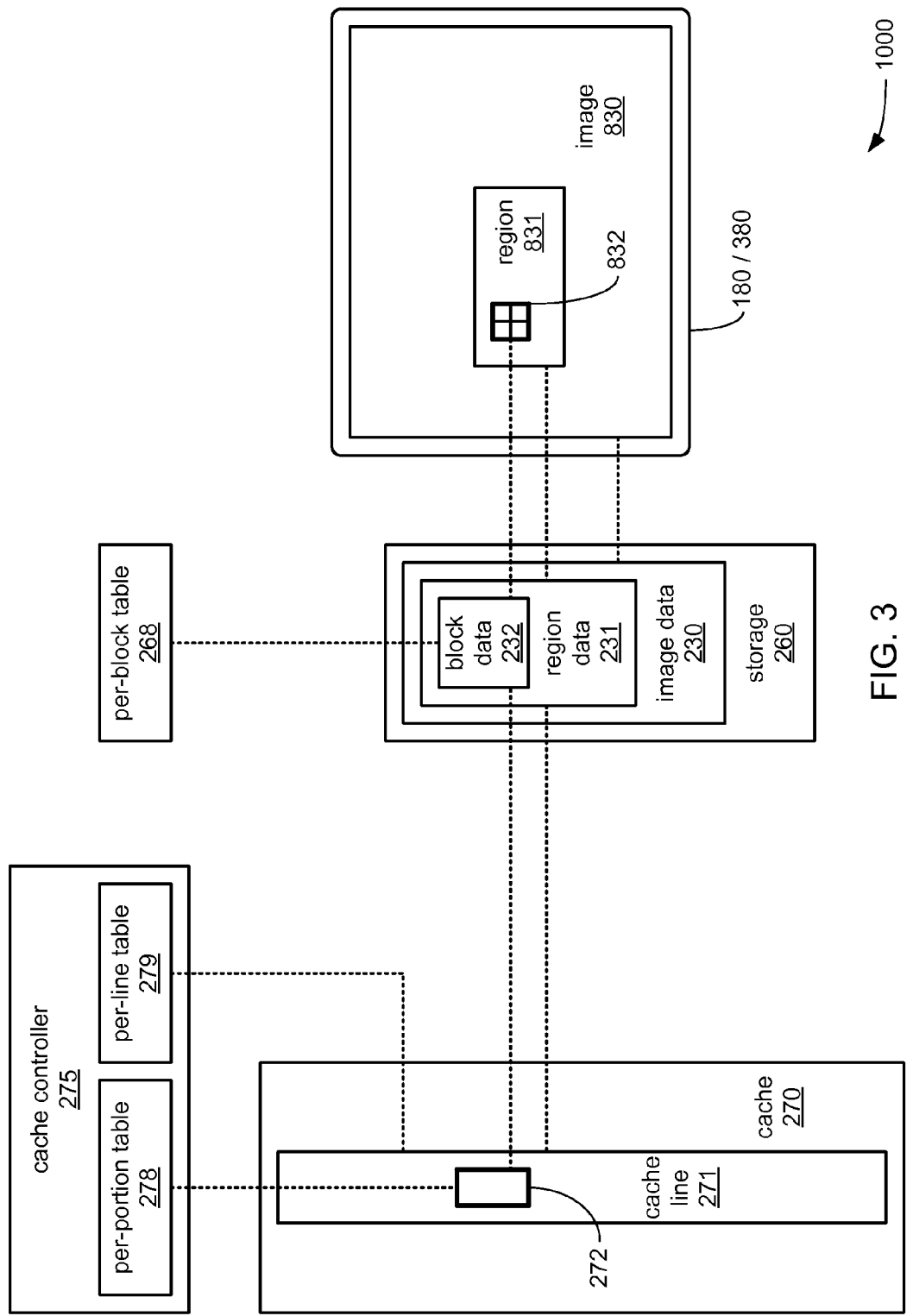
FIG. 3 illustrates relationships among portions of data and portions of the image in the embodiment of FIG. 1.

Turning briefly to FIG. 3, an example of the relationship between portions of the cache 270, the image data 230 and the image 830 is shown. The image 830 is made up of multiple regions, each of which is made up of multiple blocks of pixels. Specifically depicted within the image 830, as possibly presented on one or both of the displays 180 and 380, is one example region 831 in which one example block of pixels 832 resides.

Correspondingly, the image data 230 is made up of multiple pieces of region data, each of which is made up of multiple pieces of block data. Specifically depicted within the image data 230, as stored in the storage 260, is one example region data 231 in which one example block data 232 resides. Also correspondingly, the cache 270 is made up of multiple cache lines, each of which is made up of multiple portions. Specifically depicted within the cache 270 is one example cache line 271 in which one example portion 272 resides. As further depicted with dotted lines, the example region data 231 corresponds to the example cache line 271 and the example region 831, and the example block data 232 corresponds to the example portion 272 and the example block 832.

It should be noted that this depiction of the block 832 within the region 831, and of the region 831 within the image 830 is not to scale. It is envisioned that the image 830 is made up of numerous ones of such regions, and that the pixels are smaller in proportion to the size of the image 830. It should also be noted that although the block 832 is specifically depicted as made up of a 2×2 array of pixels, other quantities and arrangements of pixels may make up each such block in other possible embodiments. It is envisioned that the number of pixels making up the block 832 is dependent upon the number of pixels rendered and output by the rasterizing component 451 at a time. Thus, the 2×2 array of pixels making up the block 832 denotes that the rasterizing component 451 outputs color data values for four pixels at a time. However, other embodiments are possible in which the rasterizing component 451 outputs a other quantities of color data values for other quantities of pixels.

It is also envisioned that the number of pixels making up the region 831 (and therefore, the number of blocks making up the region 831) is at least partly dependent upon the width of the cache lines of the cache 270 and the color depth per pixel (i.e., the number of bits per pixel). Thus, by way of example, were the cache line 271 to have a width of 128 bytes, and were the color depth to be 32 bits per pixel, then the region 831 may be made up of a 4×8 array of pixels (and therefore, a 2×4 array of 2×2 blocks). In such an example, the 2×2 block 832 would occupy 16 bytes, which would become the size of the portion 272 within the cache line 271 such that the cache line 271 would be divided into eight portions (including the portion 272). In such an example, the per-portion table would have at least one separate bit indicating the status of each of those eight portions, and the per-block table would have at least one separate bit indicating the status of each of the corresponding eight pieces of block data (including the block data 232) to correspond with the eight blocks (including the block 832) of the region 831.

It should be noted that although the block 832 could conceivably be made up of a one-dimensional array of pixels (e.g., 1×4 pixels instead of 2×2), and although the region 831 could conceivably be made up of a one-dimensional array of blocks (e.g., 1×8 blocks instead of 2×4), it is envisioned as likely to be deemed desirable for two-dimensional arrays to be employed as has been discussed and depicted herein. As those skilled in the art will readily recognize, typical rasterizing algorithms tends render imagery in an ordering of one graphics primitive at a time. Given that many graphics primitives are polygons (of which the most common is the triangle) that overlie two-dimensional clusters of pixels, the rasterizing one graphics primitives has a tendency to follow a pattern of rendering of color data values for two-dimensional clusters of pixels at a time. Thus, the fact that the cache line 271 corresponds to a two-dimensional array of pixels making up the region 831 increases the likelihood that the resulting color values from rendering a polygon covering a two-dimensional cluster of pixels will fit entirely within the cache line 271, rather than occupying multiple cache lines. This can provide increases in efficiency.

Such support for two-dimensional arrays of pixels may coincide with the provision of support for two-dimensional arrays of samples making each pixel on occasions where the controller 200 is operated in a super-sampling anti-aliasing (SSAA) mode or a multi-sampling anti-aliasing (MSAA) mode. As will be familiar to those skilled in the art, MSAA and SSAA entail rendering effectively at a higher resolution where each pixel is divided into two or more samples, and color data values for the samples are the output of rasterization, rather than color data values for whole pixels. For example, in embodiments in which each pixel is made up of a 2×2 array of samples during MSAA or SSAA mode, the operation of the cache 270, the cache controller 275, and per-block table may change to accommodate 2×2 blocks of samples. In such an example, the handling of 2×2 arrays of samples during anti-aliasing modes and 2×2 arrays of pixels during non-anti-aliasing modes may be quite similar.

As previously discussed, the per-line table 279 monitors the state of each cache line of the cache 270. Thus, the per-line table 279 includes at least one bit that indicates whether or not any portion of the cache line 271 has been written to since the cache line 271 was last cleared (e.g., evicted) such that there are color data values stored therein by the rasterizing component 241. Further, there may be one or more additional bits within the per-line table 279 for the cache line 271 indicating how long ago it was last written to relative to other cache lines within the cache 270, and such relative passages of time since last written may be employed by the cache controller 275 in determining what cache line to evict next. However, it should be noted that selecting a cache line for eviction based on relative periods of time since each was last written is but one possible algorithm for selecting cache lines to evict. Other approaches to selecting cache lines for eviction will occur to those skilled in the art.

As previously discussed, the per-portion table 278 monitors the state of each portion of each cache line of the cache 270. Thus, the per-portion table 278 includes at least one bit for each portion of the cache line 271, including the portion 272, that indicates whether or not each of those portions has been written to since the cache line 271 was last cleared (e.g., evicted) such that there are color data values stored therein by the rasterizing component 241.

As previously discussed, the per-block table 268 monitors the state of each piece of block data within each piece of region data within the image data 230. Thus, the per-block table 268 includes at least one bit for each piece of block data of the region data 231, including the block data 232, that indicates whether or not each of those pieces of block data has been written to since the start of rendering of the image 830 such that there are color data values stored therein as a result of a cache line eviction.

At the start of rendering of the image 830, all bits of the per-block table 268 are set to a value indicating that their corresponding pieces of block data of the image data 230 have not been written with color data values such that none of their corresponding ones of the blocks of the image 830 have yet been colored. As the rasterizing component 241 then outputs color data values for blocks of pixels of the image 830, the color data values of each of those blocks fills a corresponding portion of a cache line of the cache 270. The writing of any color data values to the cache line 271 corresponding to the blocks of pixels of region 831 is indicated in the per-line table 279, and the writing of color data values for the pixels of the block 832 into the portion 272 is indicated in the per-portion table 278.

At some point, the cache line 271 is evicted. Given that the cache line 271 corresponds to the region data 231, the evicting of the cache line 271 results in the entirety of the region data 231 being written with color data values. In the process, whatever color data values were written into the portion 272 for the block of pixels 832 are written into the block data 232. This writing of the entirety of the region data 231 with color data values is indicated in the per-block table 268 as all of the bits therein that correspond to all of the pieces of block data within the region data 231 are altered to show those pieces of block data as having been written.

Figure 4:
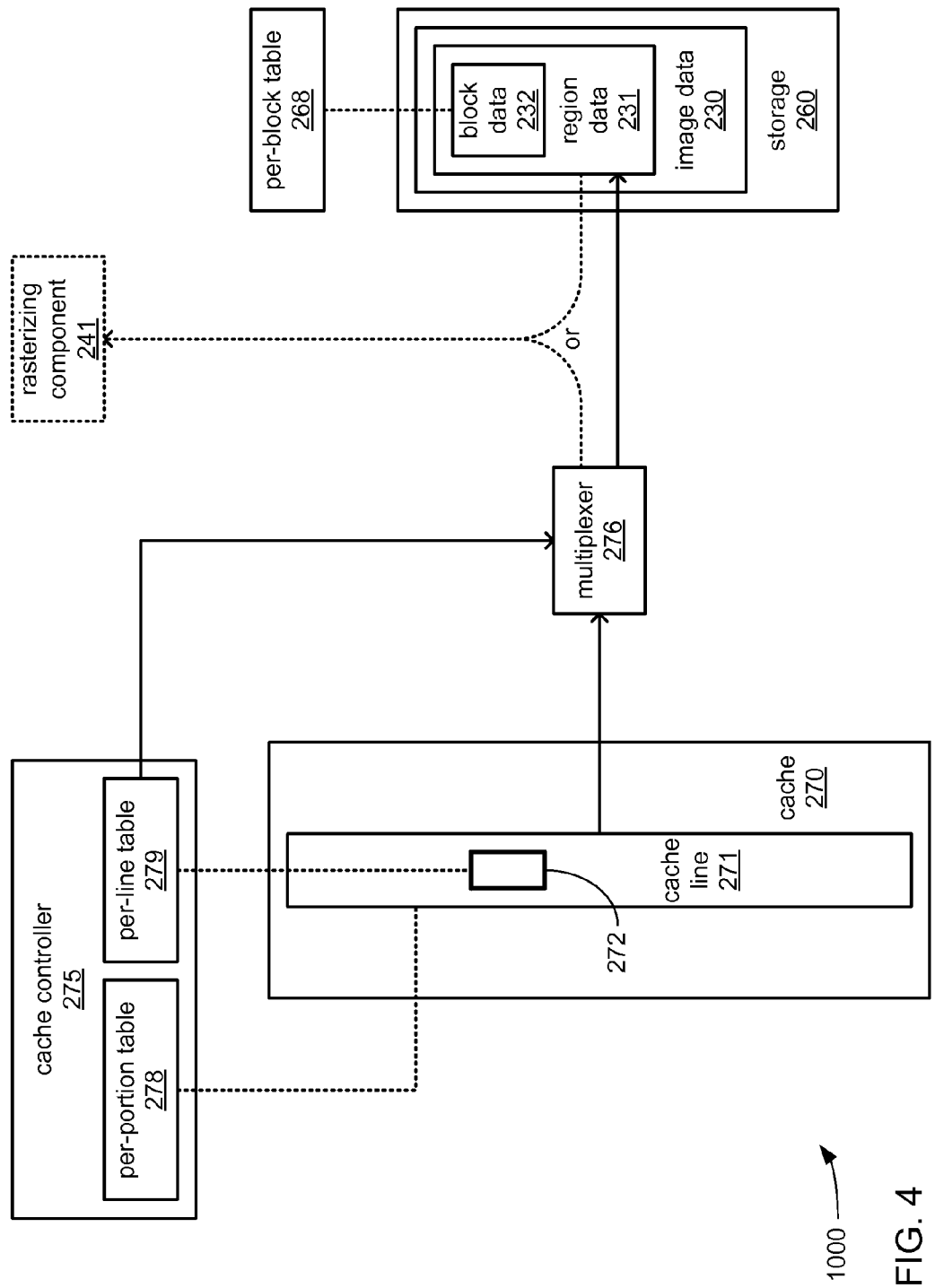
FIG. 4 illustrates a subpart of the portion of FIG. 2.

However, as previously discussed, as a cache line is evicted, the transfer of its contents to a corresponding part of the image data 230 stored in the storage 260 occurs through the multiplexer 276. FIG. 4 depicts further details of aspects of the operation of the multiplexer 276 to multiplex color data values from an evicted cache line with one or more instances of the color data value for a clear color. As previously discussed, indications in the per-portion table of what portions of an evicted cache line have been written to with color data values by the rasterizing component 241 are employed by the multiplexer 276 to determine which portions of that evicted cache will have their contents transferred to fill the image data 230 within the storage 260, and which portions of that evicted cache will have their contents discarded in favor of replacing their contents with the color data value for the clear color for their pixels.

For example, where the portion 272 is the only portion within the cache line 271 that was ever written with color data values for its pixels by the rasterizing component 241, a bit of the per-portion table 278 would be set to reflect the fact of the portion 272 having been so written, while the bits for the other portions of the cache line 271 would be set to reflect that fact that none of them have been soon written. Then, when the cache line 271 is eventually evicted, those bits for the cache line 271 would be used to control the manner in which the multiplexer 276 handles the data for each portion of the cache line 271, including the portion 272. With the portion 272 being the only portion ever written by the rasterizing component 241, the color data values within the portion 272 would be allowed to pass through the multiplexer 276 unaltered, while whatever unknown data may exist in the other portions of the cache line 271 would be discarded. Instead, for those other portions of the cache line 271, the multiplexer 276 would be caused to replace their unknown data with instances of the color data value for the clear color for each of their pixels.

FIG. 4 also depicts aspects of a possible approach to handling instances of the rasterizing component 241 attempting to read color data values from the image data 230 stored within the storage 260. Depending on whether rendering is still underway and/or what region of the image 830 for which the rasterizing component 241 attempts to read such data, such data may or may not have been written to the location of the image data 230 within the storage 260. It may be that the sought after data is still within a cache line of the cache 270, or that the sought after data has simply not been rendered yet. Where the sought after data is stored as part of the image data 230 within the storage 260, then the attempt to read this data results in one or more read operations performed on the storage 260 to retrieve it therefrom. Where the sought after data resides in a cache line of the cache 270, then the attempt to read this data results in a cache read operation performed on the cache 270 with the multiplexer employed to insert the color data value for the clear color for all pixels within cache line portions that have not yet been written to by the rasterizing component 241. Where the sought after data simply hasn't been rendered yet, the multiplexer 276 may be caused to supply a set of multiple instances of the color data value for the clear color, which befits the situation of the sought after data having not been rendered yet, since the clear color is the default color for any pixel not yet colored by rendering.

Returning to FIG. 2, following completion of rendering, the pixel color component 243 may trigger the cache controller 275 to evict all remaining cache lines with color data values written therein by the rasterizing component 241. This is done to complete the transfer of the last of the output of the rasterizing component 241 into the image data 230 at within the storage 260. The pixel coloring component 243 then employs any indication within the per-block table 268 of any regions of pixels having not yet been colored by the rasterizing component 241 to operate the multiplexer 276 (or other component, not shown) to fill those regions with the color data value for the clear color for all of the pixels within those regions. With such filling of any such remaining uncolored pixels done, the image 830 is now complete.

In some embodiments, the control routine 240 further includes a presentation component 248 executable by the processor element 250 to operate the display interface 285 (if present) to drive the image 830, as defined in the image data 230, onto the display 180, thereby visually presenting the image 830 on the display 180. Alternatively or additionally, the processor element 250 may provide the image data 230 to the processor element 150 to enable the processor element 150 to transmit the final image data 275 to another computing device (e.g., the other computing device 300) or to enable the processor element 150 to perform the task of causing the image 830 to be visually presented on the display 180 in lieu of the processor element 250 doing so.

It is important to note that although this discussion has centered on the deriving of the single image 830 from the 3D model data 130, this should not be taken as suggesting that only one image is so derived. Stated differently, the image 830 may be but one frame of a stream of frames making up motion video in which every frame is derived from the 3D model data 130 in a similar manner. As those skilled in the art of rendering of such images will readily recognize, motion video simply involves repeating such a rendering process for each frame.

Figure 5:
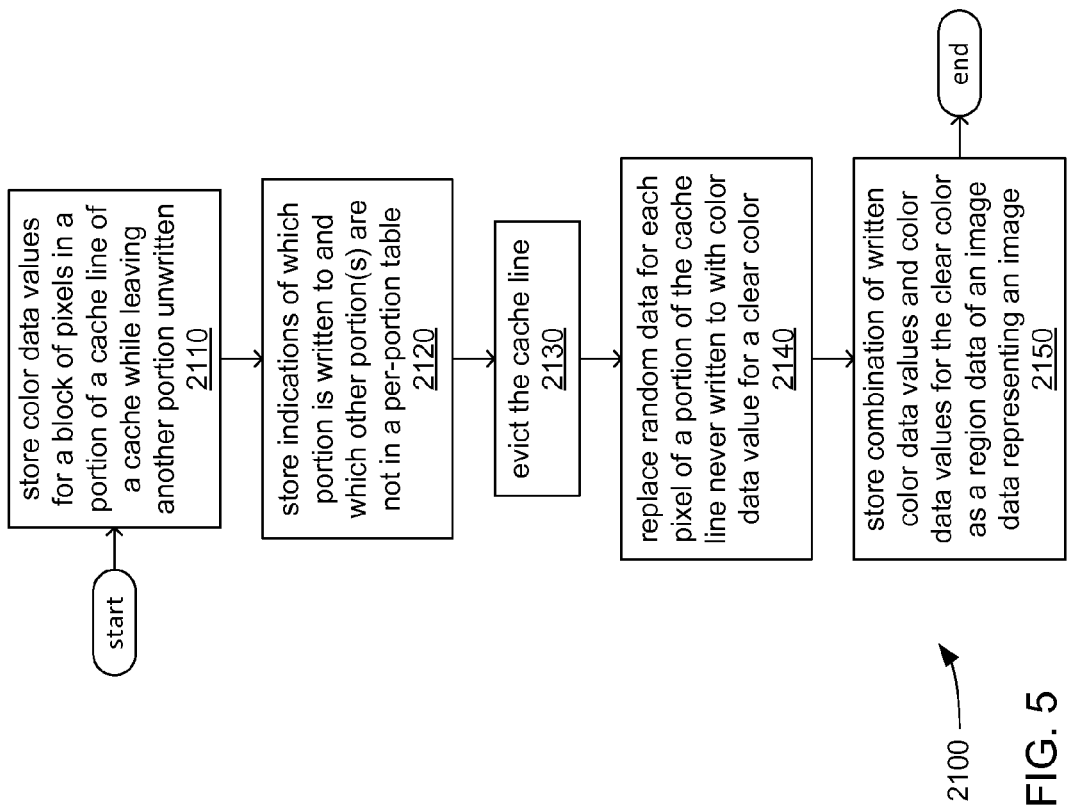
FIG. 5 illustrates an embodiment of a first logic flow.

FIG. 5 illustrates one embodiment of a logic flow 2100. The logic flow 2100 may be representative of some or all of the operations executed by one or more embodiments described herein. More specifically, the logic flow 2100 may illustrate operations performed by the processor element 250 in executing at least the control routine 240, and/or performed by other component(s) of the computing device 100. However, such operations may be performed by the processor element 150 in embodiments where this single processor element performs the functions of both of the processor elements 150 and 250.

At 2110, a processor element of a computing device (e.g., either the processor element 250 of the controller 200 of the computing device 100) stores a color data values for a block of pixels (e.g., the block 832) in a portion of a cache line (e.g., the portion 272) while leaving another portion unwritten. As has been discussed, a rasterizing component may derive and output color data values for a two-dimensional array of pixels making up a block of a region into a cache where each cache line holds color data values for a larger two-dimensional array of pixels making up a region of an image.

At 2120, indications of which portion in the cache line is written to and which other portion(s) have not been written to are stored in a per-portion table of a cache controller of the cache. As has been discussed, both a per-line table indicating the status of each cache line of the cache and a per-portion table indicating the status of each portion of each cache line are maintained by the cache controller.

At 2130, the cache line is evicted. As has been discussed, any of a variety of algorithms may be employed in selecting a cache line to evict, one of them being selecting a cache line that was last written to at a time further into the past than others.

At 2140, random data that exists in the cache line for each portion of the cache line that was not written to since last being cleared (e.g., evicted) is replaced within instance(s) of a color data value for a clear color. As previously discussed, the output of the cache is routed through a multiplexer controlled with the indications maintained in the per-portion table of which portions have been written.

At 2150, a combination of color data values from the portions that were written into and color data values for the clear color replacing the random data of the portions that were not written into are stored as a region data within the image data that represents an image. As previously discussed, the image data is stored within a location of a storage accessible to the processor element designated as the image buffer where the image is to be stored.

Figure 6:
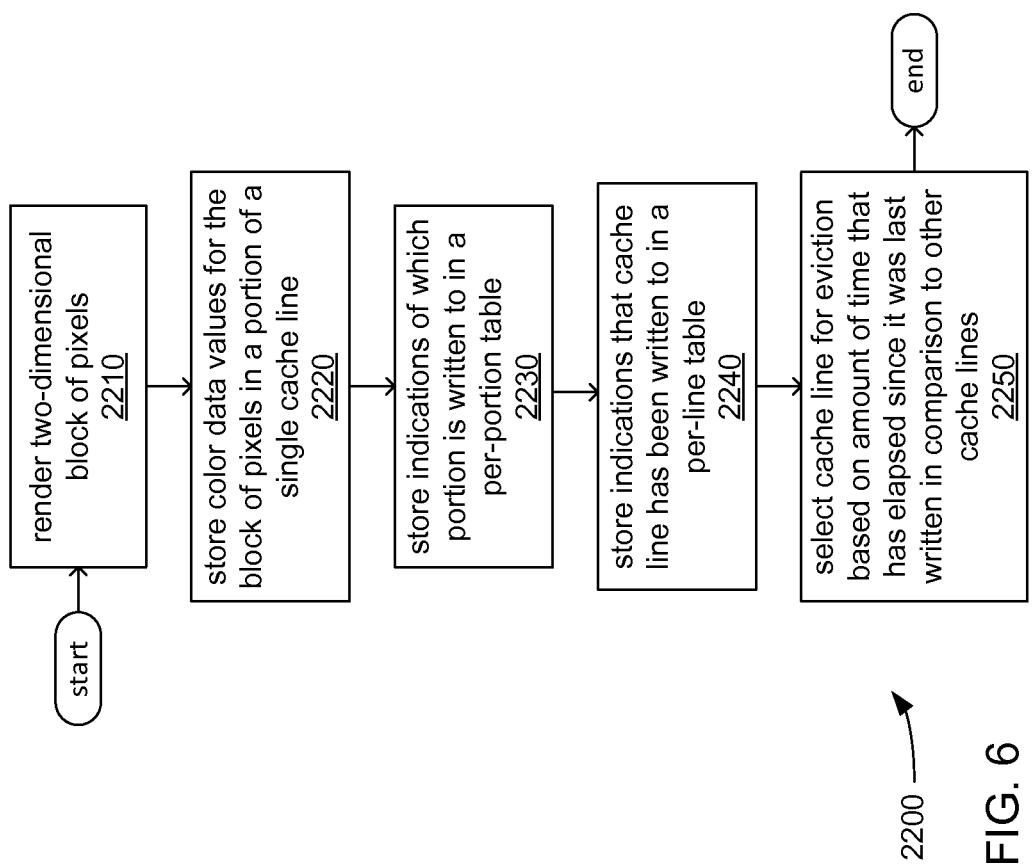
FIG. 6 illustrates an embodiment of a second logic flow.

FIG. 6 illustrates one embodiment of a logic flow 2200. The logic flow 2200 may be representative of some or all of the operations executed by one or more embodiments described herein. More specifically, the logic flow 2200 may illustrate operations performed by the processor element 250 in executing at least the control routine 240, and/or performed by other component(s) of the computing device 100. However, such operations may be performed by the processor element 150 in embodiments where this single processor element performs the functions of both of the processor elements 150 and 250.

At 2210, a processor element of a computing device (e.g., either the processor element 250 of the controller 200 of the computing device 100) renders a two-dimensional block of pixels (e.g., the block 832). At 2220, the processor element stores color data values for the pixels of that block of pixels in a portion of a single cache line of a cache (e.g., the portion 272 of the cache line 271 of the cache 270). As has been discussed, a rasterizing component may derive and output color data values for a two-dimensional array of pixels making up a block of a region into a cache where each cache line holds color data values for a larger two-dimensional array of pixels making up a region of an image.

At 2230, indications of which portion in the cache line is written to are stored in a per-portion table of a cache controller of the cache. At 2240, indications of which cache line is written is stored in a per-line table. As has been discussed, both a per-line table indicating the status of each cache line of the cache and a per-portion table indicating the status of each portion of each cache line are maintained by the cache controller.

At 2250, the cache line is selected for eviction based on an amount of time that has elapsed since it was last written to in comparison to other cache lines. As has been discussed, however, other algorithms for selecting a cache line to evict may be used in other possible embodiments.

Figure 7:
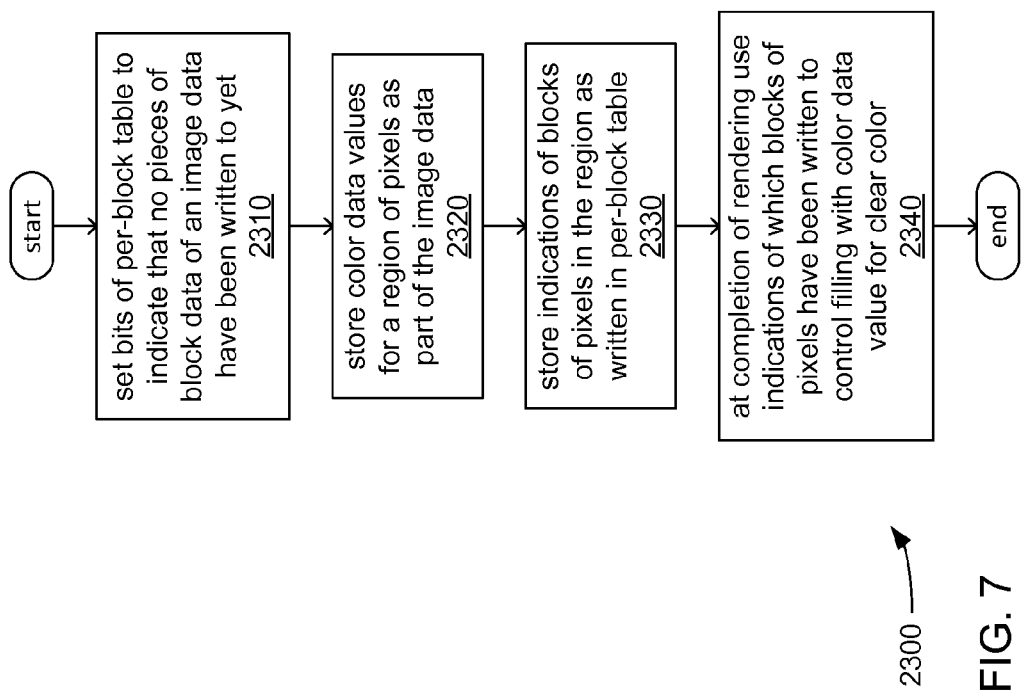
FIG. 7 illustrates an embodiment of a third logic flow.

FIG. 7 illustrates one embodiment of a logic flow 2300. The logic flow 2300 may be representative of some or all of the operations executed by one or more embodiments described herein. More specifically, the logic flow 2300 may illustrate operations performed by the processor element 250 in executing at least the control routine 240, and/or performed by other component(s) of the computing device 100. However, such operations may be performed by the processor element 150 in embodiments where this single processor element performs the functions of both of the processor elements 150 and 250.

At 2310, a processor element of a computing device (e.g., either the processor element 250 of the controller 200 of the computing device 100) sets bits of a per-block table to indicate that no pieces of block data of an image data representing an image have yet been written with color data values. As has been discussed, the image data may be made up of multiple pieces of region data, each representing a two-dimensional array of pixels making up a region of the image. Also, each piece of region data may be made up of multiple pieces of block data, each representing a smaller two-dimensional array of pixels making up a block of a region.

At 2320, color data values for a region of pixels of the image are stored in a region data of the image data. As has been discussed, with each eviction of a cache line, color data values for an entire region of the image are transferred to and stored within a region data of the image data that represents that image.

At 2330, indications of the pieces of block data of the region data as having been written are stored in the per-block table. At 2340, upon completion of rendering of the image, the indications of which pieces of block data have been written to are used to control a selective filling of pieces of block data with a color data value representing a clear color.

Figure 8:
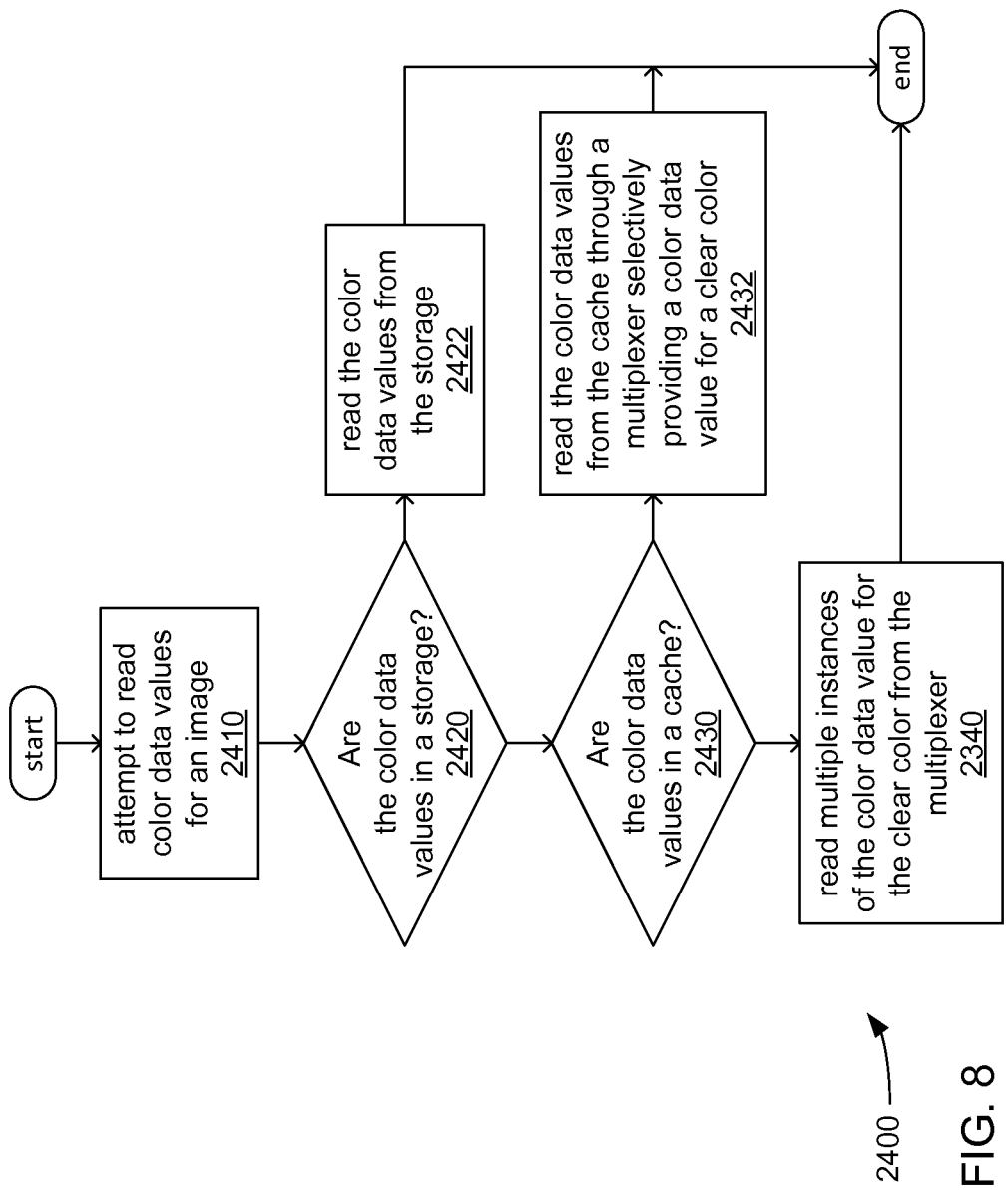
FIG. 8 illustrates an embodiment of a fourth logic flow.

FIG. 8 illustrates one embodiment of a logic flow 2400. The logic flow 2400 may be representative of some or all of the operations executed by one or more embodiments described herein. More specifically, the logic flow 2400 may illustrate operations performed by the processor element 250 in executing at least the control routine 240, and/or performed by other component(s) of the computing device 100. However, such operations may be performed by the processor element 150 in embodiments where this single processor element performs the functions of both of the processor elements 150 and 250.

At 2410, a processor element of a computing device (e.g., either the processor element 250 of the controller 200 of the computing device 100) attempts to read one or more color data values of pixels of a region of an image. At 2420, a storage of the computing device (e.g., the storage 260) is checked to determine whether those color data values have been written into a region data corresponding to that region. As has been explained, bits of a per-block table may be checked to determine if the pieces of block data of a region data of the image data have been written with color data values yet. If the sought-after color data values have been written into that region data within the storage, then the color data values are read from that storage at 2422.

However, if those color data values have not been written to the storage, then at 2430, a check is made to determine whether the color data values are in a cache line of a cache of the computing device (e.g., the cache 270) that has not yet been evicted to the storage. As has been discussed, a per-line table tracks the status of each cache line, including whether any portion of it has been written to with any color data values. If the sought-after color data values have been written into a cache line of the cache, then the color data values are from the cache at 2432.

However, if those color data values are not to be found in either of the storage or the cache, then the attempted read operation is responded to with multiple instances of the color data value of a clear color for each pixel of that region of the image. This is in keeping with the clear color being the default color for each pixel until colored via rendering.

Figure 9:
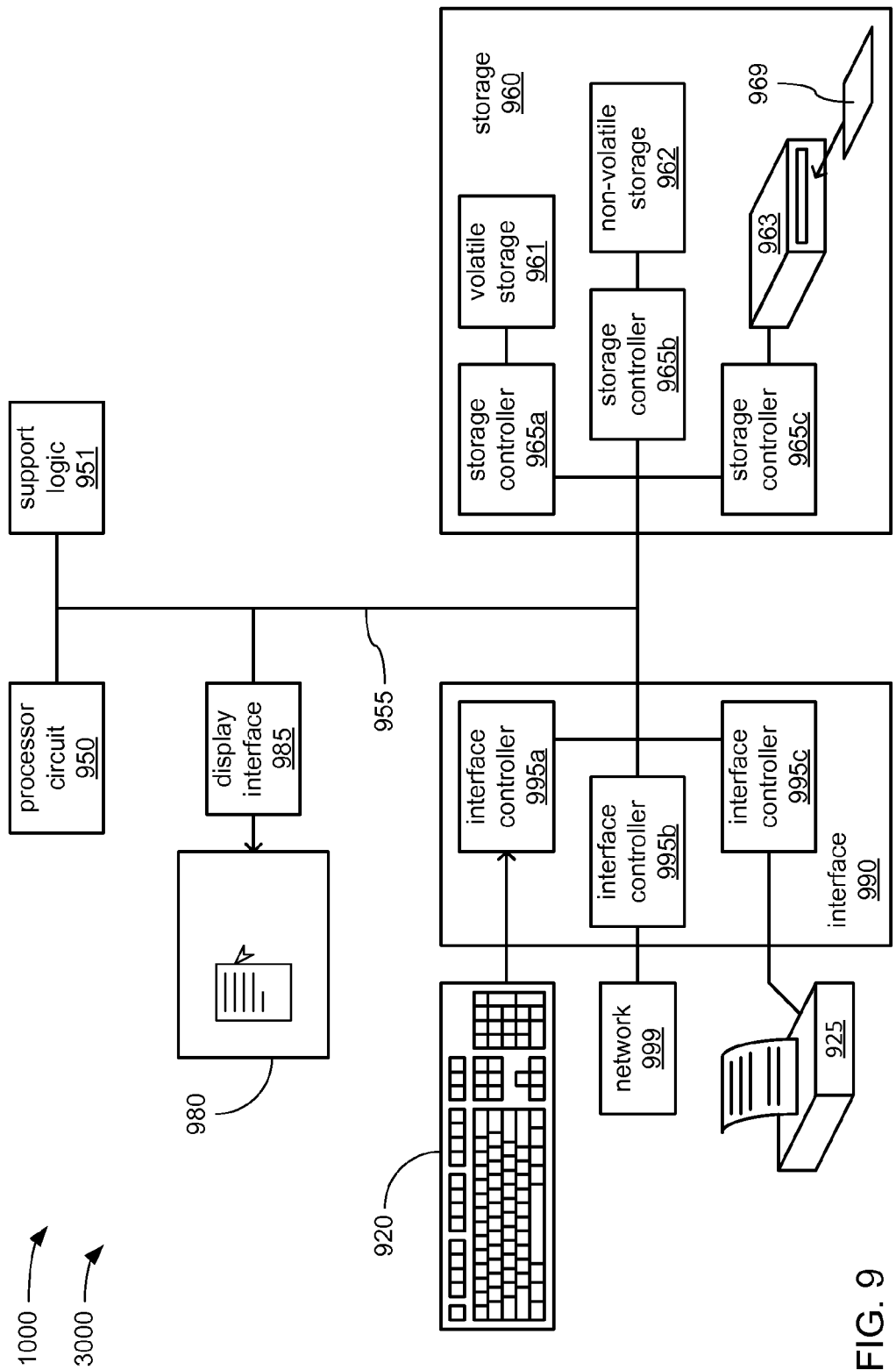
FIG. 9 illustrates an embodiment of a processing architecture.

FIG. 9 illustrates an embodiment of an exemplary processing architecture 3000 suitable for implementing various embodiments as previously described. More specifically, the processing architecture 3000 (or variants thereof) may be implemented as part of the computing device 1000 and/or the controller 200. It should be noted that components of the processing architecture 3000 are given reference numbers in which the last two digits correspond to the last two digits of reference numbers of components earlier depicted and described as part of the computing device 1000 and the controller 200. This is done as an aid to correlating such components of the computing device 1000 and the controller 200 may employ this exemplary processing architecture in various embodiments.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor element 950, support logic 951, a storage 960, a controller 900, an interface 990 to other devices, and coupling 955. As will be explained, depending on various aspects of a computing device implementing the processing architecture 3000, including its intended use and/or conditions of use, such a computing device may further include additional components, such as without limitation, a display interface 985.

Coupling 955 includes one or more buses, point-to-point interconnects, transceivers, buffers, crosspoint switches, and/or other conductors and/or logic that communicatively couples at least the processor element 950 to the storage 960. Coupling 955 may further couple the processor element 950 to one or more of the interface 990, the audio subsystem 970 and the display interface 985 (depending on which of these and/or other components are also present). With the processor element 950 being so coupled by couplings 955, the processor element 950 is able to perform the various ones of the tasks described at length, above, for whichever ones of the computing device 1000 and the controller 200 implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 950 (corresponding to the processor elements 150 and 250) may include any of a wide variety of commercially available processors, employing any of a wide variety of technologies and implemented with one or more cores physically combined in any of a number of ways.

As previously discussed, the storage 960 (corresponding to the storage 160 and 260) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor element 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor element 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 180), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to render visual imagery includes a processor element; and logic for execution on a processor element to store color data values of a block of pixels of an image in a first portion of a cache line of a cache, store an indication of the first portion as written and of a second portion of the cache line as not written in a per-portion table, evict contents of the first and second portions to an image data that represents the image and is stored in a storage, and store the contents of the first portion in the image data and store an instance of a color data value of a clear color in place of the contents of the second portion in the image data in response to the indications stored in the per-portion table.

The above example of an apparatus in which the block of pixels includes a first two-dimensional array of pixels of a region of pixels of the image, and the region comprising a second two-dimensional array of pixels larger than the first two-dimensional array.

Either of the above examples of an apparatus in which the logic is to store an indication of when the cache line was last written to in comparison to other cache lines of the cache in a per-line table, and select the cache line to be evicted in response to the cache line having been written to less recently than at least one other cache line.

Any of the above examples of an apparatus in which the logic is to derive the color data values of the block of pixels by rasterization of at least one graphics primitive of an object.

Any of the above examples of an apparatus in which the logic is to evict all cache lines of the cache that still store color data values in response to completion of rendering of the image.

Any of the above examples of an apparatus in which the apparatus includes a multiplexer to, the multiplexer responsive to the indication stored in the per-portion table to pass through the contents of the first portion to the storage, discard the contents of the second portion, and provide the instance of the color data value of the clear color to the storage in place of the contents of the second portion.

Any of the above examples of an apparatus in which the logic is to initialize bits of the per-block table to indicate that no piece of block data in a first region data of the image data and no piece of block data in a second region data of the image data is written, and alter a subset of the bits of the per-block table to store an indication of multiple pieces of block data of the first region data as written in response to the storage of the contents of the first portion and the instance of the color data value of the clear color in the first region data.

Any of the above examples of an apparatus in which the logic is to store multiple instances of the color data value of the clear color in the second region data in response to completion of rendering of the image and in response to the indications stored in the per-block table of no pieces of block data in the second region data as written.

Any of the above examples of an apparatus in which the per-block table is to alternately serve to indicate whether a block of samples of a single pixel are written in an anti-aliasing mode.

Any of the above examples of an apparatus in which the logic is to select one of the cache line and the image data to provide a color data value of a pixel to respond to a read operation to read the color data value of the pixel in response to whether the color data value of the pixel is stored in the cache line or in the image data.

Any of the above examples of an apparatus in which the logic is to provide a color data value of the clear color to respond to the read operation in response to the color data value of the pixel not having been stored in either of the cache line or the image data.

An example of another apparatus to render visual imagery includes a processor element; and a logic to initialize bits of a per-block table to indicate that no piece of block data in a first region data of an image data that represents the image and no piece of block data in a second region data of the image data is written, store color data values in the first region data, store an indication of the first region data as written in the per-block table, and store multiple instances of a color data value of a clear color in the second region data in response to completion of rendering of the image and in response to indications stored in the per-block table of no pieces of block data in the second region data as written.

The above example of another apparatus in which the apparatus includes a cache, and the logic is to store color data values of a block of pixels of the image in a first portion of a cache line of the cache, store an indication of the first portion as written and of a second portion of the cache line as not written in a per-portion table, evict contents of the first and second portions to the image data, and store the contents of the first portion in the image data and store an instance of a color data value of a clear color in place of the contents of the second portion in the first region data in response to the indications stored in the per-portion table.

Either of the above examples of another apparatus in which the block of pixels includes a first two-dimensional array of pixels of a region of pixels of the image, and the region includes a second two-dimensional array of pixels larger than the first two-dimensional array.

Any of the above examples of another apparatus in which the logic is to store an indication of when the cache line was last written to in comparison to other cache lines of the cache in a per-line table; and select the cache line to be evicted in response to the cache line having been written to less recently than at least one other cache line.

Any of the above examples of another apparatus in which the logic is to derive the color data values of the block of pixels by rasterization of at least one graphics primitive of an object.

Any of the above examples of another apparatus in which the logic is to evict all cache lines of the cache that still store color data values in response to completion of rendering of the image.

An example of a computer-implemented method of rendering visual imagery includes deriving color data values of a two-dimensional block of pixels of an image by rasterization of at least one graphics primitive of an object, storing the color data values in a first portion of a cache line of a cache, storing an indication of the first portion as written and of a second portion of the cache line as not written in a per-portion table, evicting contents of the first and second portions to an image data that represents the image and is stored in a storage, and storing the contents of the first portion in the image data and store an instance of a color data value of a clear color in place of the contents of the second portion in the image data in response to the indications stored in the per-portion table.

The above example of a computer-implemented method in which the method includes storing an indication of when the cache line was last written to in comparison to other cache lines of the cache in a per-line table, and selecting the cache line to be evicted in response to the cache line having been written to less recently than at least one other cache line.

Either of the above examples of a computer-implemented method in which the method includes evicting all cache lines of the cache that still store color data values in response to completion of rendering of the image.

Any of the above examples of a computer-implemented method in which the method includes initializing bits of a per-block table to indicate that no piece of block data in a first region data of the image data and no piece of block data in a second region data of the image data is written, and altering a subset of the bits of the per-block table to store an indication of multiple pieces of block data of the first region data as written in response to the storage of the contents of the first portion and the instance of the color data value of the clear color in the first region data.

Any of the above examples of a computer-implemented method in which the method includes storing multiple instances of the color data value of the clear color in the second region data in response to completion of rendering of the image and in response to the indications stored in the per-block table of no pieces of block data in the second region data as written.

Any of the above examples of a computer-implemented method in which the method includes selecting one of the cache line and the image data to provide a color data value of a pixel to respond to a read operation to read the color data value of the pixel in response to whether the color data value of the pixel is stored in the cache line or in the image data.

Any of the above examples of a computer-implemented method in which the method includes providing a color data value of the clear color to respond to the read operation in response to the color data value of the pixel not having been stored in either of the cache line or the image data.

An example of an apparatus to render visual imagery includes means for performing any of the above examples of a computer-implemented method.

An example of at least one machine-readable storage medium includes instructions that when executed by a computing device, cause the computing device to derive color data values of a two-dimensional block of pixels of an image of an object by rasterization of at least one graphics primitive of the object, store the color data values in a first portion of a cache line of a cache, store an indication of the first portion as written and of a second portion of the cache line as not written in a per-portion table, evict contents of the first and second portions to an image data that represents the image and is stored in a storage, and store the contents of the first portion in the image data and store an instance of a color data value of a clear color in place of the contents of the second portion in the image data in response to the indications stored in the per-portion table.

The above example of at least one machine-readable storage medium in which the computing device is caused to store an indication of when the cache line was last written to in comparison to other cache lines of the cache in a per-line table, and select the cache line to be evicted in response to the cache line having been written to less recently than at least one other cache line.

Either of the above examples of at least one machine-readable storage medium in which the computing device is caused to evict all cache lines of the cache that still store color data values in response to completion of rendering of the image.

Any of the above examples of at least one machine-readable storage medium in which the computing device is caused to initialize bits of a per-block table to indicate that no piece of block data in a first region data of the image data and no piece of block data in a second region data of the image data is written, and alter a subset of the bits of the per-block table to store an indication of multiple pieces of block data of the first region data as written in response to the storage of the contents of the first portion and the instance of the color data value of the clear color in the first region data.

Any of the above examples of at least one machine-readable storage medium in which the computing device is caused to store multiple instances of the color data value of the clear color in the second region data in response to completion of rendering of the image and in response to the indications stored in the per-block table of no pieces of block data in the second region data as written.

Any of the above examples of at least one machine-readable storage medium in which the computing device is caused to select one of the cache line and the image data to provide a color data value of a pixel to respond to a read operation to read the color data value of the pixel in response to whether the color data value of the pixel is stored in the cache line or in the image data.

Any of the above examples of at least one machine-readable storage medium in which the computing device is caused to provide a color data value of the clear color to respond to the read operation in response to the color data value of the pixel not having been stored in either of the cache line or the image data.

An example of still another apparatus to render visual imagery includes means for deriving color data values of a two-dimensional block of pixels of an image of an object by rasterization of at least one graphics primitive of the object, storing the color data values in a first portion of a cache line of a cache, storing an indication of the first portion as written and of a second portion of the cache line as not written in a per-portion table, evicting contents of the first and second portions to an image data that represents the image and is stored in a storage, and storing the contents of the first portion in the image data and store an instance of a color data value of a clear color in place of the contents of the second portion in the image data in response to the indications stored in the per-portion table.

The above example of still another apparatus includes means for storing an indication of when the cache line was last written to in comparison to other cache lines of the cache in a per-line table, and selecting the cache line to be evicted in response to the cache line having been written to less recently than at least one other cache line.

Either of the above examples of still another apparatus includes means for evicting all cache lines of the cache that still store color data values in response to completion of rendering of the image.

Any of the above examples of still another apparatus includes means for initializing bits of a per-block table to indicate that no piece of block data in a first region data of the image data and no piece of block data in a second region data of the image data is written, and altering a subset of the bits of the per-block table to store an indication of multiple pieces of block data of the first region data as written in response to the storage of the contents of the first portion and the instance of the color data value of the clear color in the first region data.

Any of the above examples of still another apparatus includes means for storing multiple instances of the color data value of the clear color in the second region data in response to completion of rendering of the image and in response to the indications stored in the per-block table of no pieces of block data in the second region data as written.

Any of the above examples of still another apparatus includes means for selecting one of the cache line and the image data to provide a color data value of a pixel to respond to a read operation to read the color data value of the pixel in response to whether the color data value of the pixel is stored in the cache line or in the image data.

Any of the above examples of still another apparatus includes means for providing a color data value of the clear color to respond to the read operation in response to the color data value of the pixel not having been stored in either of the cache line or the image data.

The invention claimed is:
1. An apparatus comprising:
 a processor element to execute instructions to render color data values of a block of pixels of an image into a first portion of a cache line of a cache;
 a cache controller to store an indication of the first portion as written and of a second portion of the cache line as not written in a per-portion table in response to the rendering of color data values into the first portion and a lack of rendering of color data values into the second portion and evict contents of the cache line, including the first and second portions, through a multiplexer to an image data that represents the image and is stored in a storage; and the multiplexer to store the contents of the first portion in the image data within the storage without modification in response to the indication of the first portion as written, and replace the contents of the second portion with an instance of a color data value indicative of a clear color in response to the indication of the second portion as not written and prior to storage of the contents of the second portion in the image data within the storage.

2. The apparatus of claim 1, the block of pixels comprising a first two-dimensional array of pixels of a region of pixels of the image, and the region comprising a second two-dimensional array of pixels larger than the first two-dimensional array.

3. The apparatus of claim 1, the cache controller to:
store an indication of when the cache line was last written to in comparison to other cache lines of the cache in a per-line table; and
select the cache line to be evicted in response to the cache line having been written to less recently than at least one other cache line.

4. The apparatus of claim 1, comprising a per-block table, the processor element to:
initialize bits of the per-block table to indicate that no piece of block data in a first region data of the image data and no piece of block data in a second region data of the image data is written; and
alter a subset of the bits of the per-block table to store an indication of multiple pieces of block data of the first region data as written in response to the storage of the contents of the first portion and the instance of the color data value of the clear color in the first region data.

5. The apparatus of claim 4, the processor element to store multiple instances of the color data value of the clear color in the second region data in response to completion of rendering of the image and in response to the indications stored in the per-block table of no pieces of block data in the second region data as written.

6. The apparatus of claim 4, the per-block table to alternately serve to indicate whether a block of samples of a single pixel are written in an anti-aliasing mode.

7. The apparatus of claim 1, the cache controller to select one of the cache line and the image data to provide a color data value of a pixel to respond to a read operation to read the color data value of the pixel in response to whether the color data value of the pixel is stored in the cache line or in the image data.

8. The apparatus of claim 7, the multiplexer to provide a color data value of the clear color to respond to the read operation in response to the color data value of the pixel not having been stored in either of the cache line or the image data.

9. A computing-implemented method comprising:
rendering color data values of a two-dimensional block of pixels of an image into a first portion of a cache line of a cache;
storing an indication of the first portion as written and of a second portion of the cache line as not written in a per-portion table in response to the rendering of color data values into the first portion and a lack of rendering of color data values into the second portion;
evicting contents of the cache line, including the first and second portions, through a multiplexer to an image data that represents the image and is stored in a storage;
storing the contents of the first portion in the image data within the storage without modification by the multiplexer in response to the indication of the first portion as written; and
replacing, within the multiplexer, the contents of the second portion with an instance of a color data value indicative of a clear color in response to the indication of the second portion as not and written prior to storage of the contents of the second portion in the image data within the storage.

10. The computer-implemented method of claim 9 comprising:
storing an indication of when the cache line was last written to in comparison to other cache lines of the cache in a per-line table; and
selecting the cache line to be evicted in response to the cache line having been written to less recently than at least one other cache line.

11. The computer-implemented method of claim 9 comprising evicting all cache lines of the cache that still store color data values in response to completion of rendering of the image.

12. The computer-implemented method of claim 9 comprising:
initializing bits of a per-block table to indicate that no piece of block data in a first region data of the image data and no piece of block data in a second region data of the image data is written; and
altering a subset of the bits of the per-block table to store an indication of multiple pieces of block data of the first region data as written in response to the storage of the contents of the first portion and the instance of the color data value of the clear color in the first region data.

13. The computer-implemented method of claim 12 comprising storing multiple instances of the color data value of the clear color in the second region data in response to completion of rendering of the image and in response to the indications stored in the per-block table of no pieces of block data in the second region data as written.

14. At least one machine-readable storage medium comprising instructions that when executed by a computing device, cause the computing device to:
render color data values of a two-dimensional block of pixels of an image of an object into a first portion of a cache line of a cache;
store an indication of the first portion as written and of a second portion of the cache line as not written in a per-portion table in response to the rendering of color data values into the first portion and a lack of rendering of color data values into the second portion;
evict contents of the cache line, including the first and second portions, through a multiplexer to an image data that represents the image and is stored in a storage;
store the contents of the first portion in the image data within the storage without modification by the multiplexer in response to the indication of the first portion as written; and
replace, within the multiplexer, the contents of the second portion with an instance of a color data value indicative of a clear color in response to the indication of the second portion as not written and prior to storage of the contents of the second portion in the image data within the storage.

15. The at least one machine-readable storage medium of claim 14, the computing device caused to:
   store an indication of when the cache line was last written to in comparison to other cache lines of the cache in a per-line table; and
   select the cache line to be evicted in response to the cache line having been written to less recently than at least one other cache line.

16. The at least one machine-readable storage medium of claim 14, the computing device caused to:
   initialize bits of a per-block table to indicate that no piece of block data in a first region data of the image data and no piece of block data in a second region data of the image data is written; and
   alter a subset of the bits of the per-block table to store an indication of multiple pieces of block data of the first region data as written in response to the storage of the contents of the first portion and the instance of the color data value of the clear color in the first region data.

17. The at least one machine-readable storage medium of claim 16, the computing device caused to store multiple instances of the color data value of the clear color in the second region data in response to completion of rendering of the image and in response to the indications stored in the per-block table of no pieces of block data in the second region data as written.

18. The at least one machine-readable storage medium of claim 14, the computing device caused to select one of the cache line and the image data to provide a color data value of a pixel to respond to a read operation to read the color data value of the pixel in response to whether the color data value of the pixel is stored in the cache line or in the image data.

19. The at least one machine-readable storage medium of claim 14, the computing device caused to provide a color data value of the clear color to respond to the read operation in response to the color data value of the pixel not having been stored in either of the cache line or the image data.

* * * * *